May 9, 1939.　　　　V. A. PARTZ　　　　2,157,430

MOTOR CIRCUIT

Filed July 23, 1937

Inventor:
Victor A. Partz,
By: Bertha L. MacGregor
Attorney

Patented May 9, 1939

2,157,430

UNITED STATES PATENT OFFICE 2,157,430

MOTOR CIRCUIT

Victor A. Partz, Racine, Wis., assignor to Scovill Manufacturing Company, Waterbury, Conn., a corporation of Connecticut Application July 23, 1937, Serial No. 155,255

2 Claims. (Cl. 171—97)

This invention relates to electric motor circuits, and particularly to circuits for fractional horse power motors for food mixers, juice extractors, drink mixers, vacuum cleaners and other household devices. Reference is made to the joint application of Emanuel Nielsen and myself, Serial No. 116,767, filed December 19, 1936, upon which Patent No. 2,106,058 issued January 18, 1938, wherein is shown an electric motor particularly adapted for food mixers and the like, embodying the electric circuit of the present invention.

The main object of the invention is to provide a motor circuit including a filter condenser for suppressing radio interference, the filter being so located in the circuit as to provide maximum radio interference suppression and minimum current leakage to the ground connection.

The reduction of current leakage obviates the danger of electric shock to users of household devices equipped with my invention and avoids the need for using double pole switches, without any reduction in the effectiveness of the filter.

Figure 1:
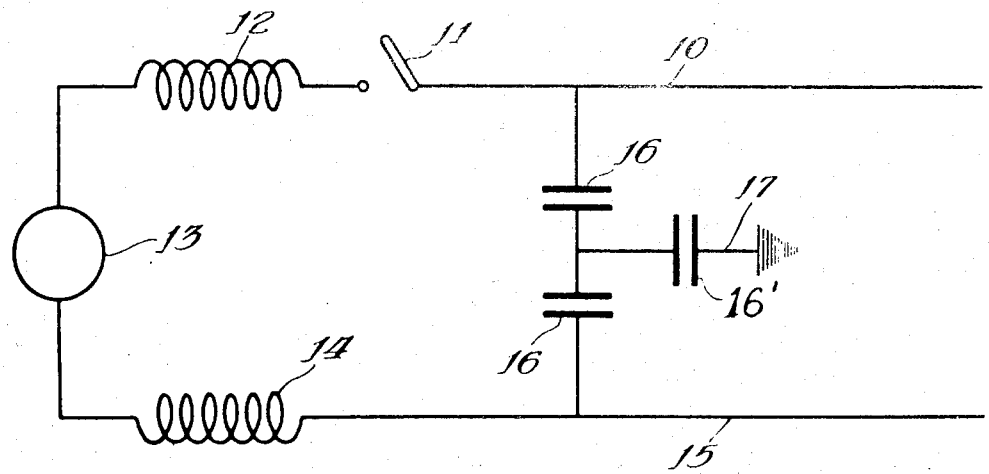
Fig. 1 is a diagrammatic view of an electric motor circuit embodying my invention.

Referring to the circuit shown in Fig. 1, the electric current supply line 10 is provided with a switch 11. When the switch 11 is closed, current passes to the field coil 12, armature 13, field coil 14, and line 15.

A radio interference filter, preferably comprising two condensers 16 connected in series, is connected to the lines 10 and 15 on the line side of the switch 11, and a third condenser 16' is connected in the ground wire 17 which is connected to the casing of the motor.

Figure 2:
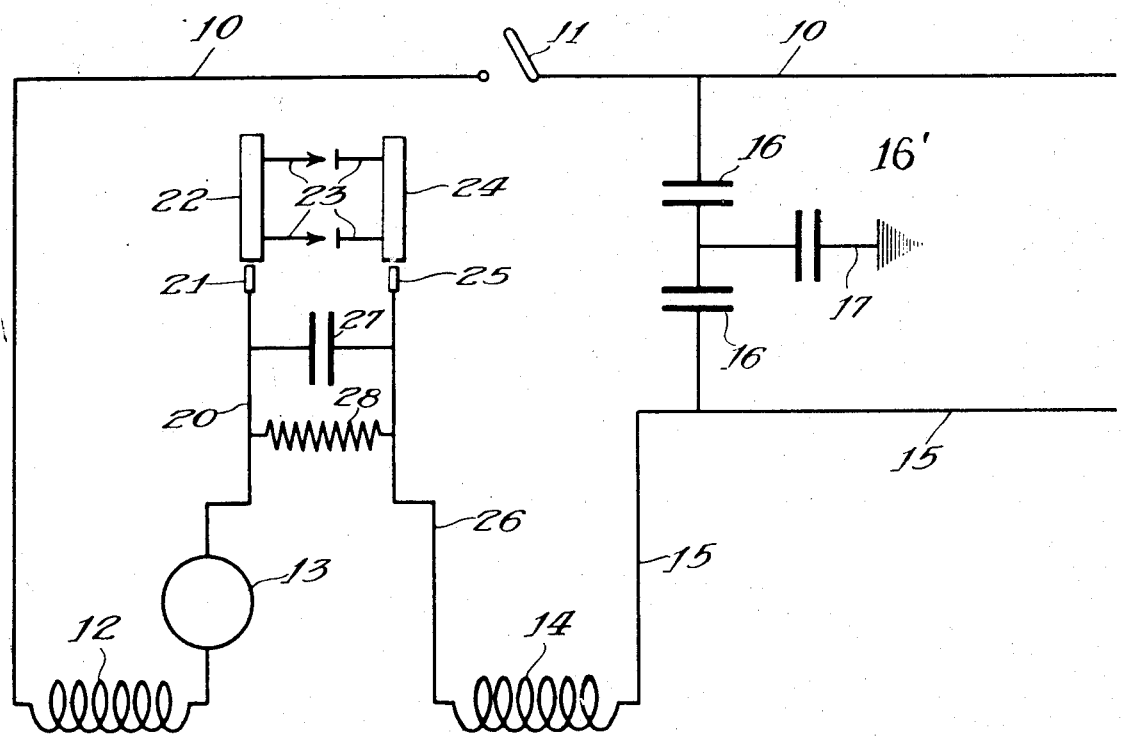
Fig. 2 is a similar view of a circuit especially adapted for a motor equipped with speed controlling means, such as is used in food mixers and similar devices.

Referring to Fig. 2, identical numerals have been used to designate parts of the circuit corresponding to the circuit of Fig. 1. The circuit of Fig. 2, being adapted for a motor equipped with speed controlling means, has connected in that part of the line between the armature 13 and field coil 14, the following parts: a line 20 to brush 21, contacting collector ring 22 which is electrically connected by make and break mechanism 23 to collector ring 24, brush 25, and line 26. An arc suppressing condenser 27 and a resistance 28 for protecting the points of the make and break mechanism 23 are connected in parallel across the lines 20 and 26. As in the circuit of Fig. 1, the radio interference filter comprising condensers 16 is connected across the lines 10, 15 on the line side of the switch 11, and grounded by the wire 17 in which is preferably connected the condenser 16'.

By placing the filter in the line side of the motor circuit, the current leakage from the motor frame to a grounded part of the circuit is reduced to a minimum. The two condensers 16 short circuit the high frequency current generated in the line. The condensers 16 and 16' short circuit the high frequency generated between the conductors and the case.

Assuming the line voltage to be 110 volts, the series-connected condensers give 55 volts to the tap between the condensers and either line 10 or 15. In prior art circuits, the filter condensers are connected across the circuit on the other, or armature, side of the switch 11, and when the switch is open, the current flow through the condensers to ground is either 110 volts or zero volts, depending on the position in which the cord plug is inserted in its socket. If the cord plug is inserted in the wrong position, twice as much current passes to ground as in my circuit, resulting in substantial shock to the user of the motor driven device. To overcome this objection without reducing the value of the filter condensers, it is necessary to use a double pole switch, whereas with the circuit of my invention, with the filter connected across the line on the line side of the switch 11, there is no need for using a double pole switch and no danger of shock resulting from passage of current to ground, regardless of the way the cord plug is inserted in its socket.

I claim:

1. In combination with an electric motor and casing, a motor circuit having a single pole switch in the line, and a filter grounded to the motor casing, said filter comprising condensers connected in series across the line on the line side of the switch, the voltage across the condensers to the casing being one-half of the line voltage when the switch is open, thus reducing the leakage current, regardless of whether the live or neutral side of the motor circuit is connected to the live side of a source of current supply.

2. In combination with an electric motor and casing a motor circuit having a single pole switch in the line a filter grounded to the motor casing, said filter comprising condensers connected in series across the line on the line side of the switch and a condenser in the ground wire, the voltage across the condensers to the casing being one-half of the line voltage when the switch is open, thus reducing the leakage current, regardless of whether the live or neutral side of the motor circuit is connected to the live side of a source of current supply.

VICTOR A. PARTZ.